United States Patent
Bryant et al.

(10) Patent No.: US 7,540,009 B1
(45) Date of Patent: May 26, 2009

(54) USE TAGGING IN TELEVISION PROGRAMS FOR SCENE FILTERING AND ALERTS

(75) Inventors: Raquel Benita Bryant, Raleigh, NC (US); Veronique Le Shan Tice Moses, Raleigh, NC (US); Zendre Necole Simmons, Durham, NC (US); Johnissia Raymonde Stevenson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/165,485

(22) Filed: Jun. 30, 2008

(51) Int. Cl.
*H04N 7/16* (2006.01)

(52) U.S. Cl. .............. 725/28; 725/20; 725/25; 725/34; 725/136

(58) Field of Classification Search ............ 725/9, 725/14, 20, 25, 28, 34, 45, 46, 47, 135, 136, 725/139, 145, 149, 151; 386/46
See application file for complete search history.

(56) References Cited

U.S. PATENT DOCUMENTS

| | | | |
|---|---|---|---|
| 6,351,596 B1 | 2/2002 | Ostrover | |
| 2002/0029383 A1* | 3/2002 | Moir | 725/40 |
| 2003/0088872 A1 | 5/2003 | Malssel et al. | |
| 2003/0192044 A1* | 10/2003 | Huntsman | 725/25 |
| 2004/0255321 A1 | 12/2004 | Matz | |
| 2006/0130119 A1 | 6/2006 | Candelore et al. | |
| 2006/0130121 A1 | 6/2006 | Candelore et al. | |
| 2007/0204288 A1 | 8/2007 | Candelore | |
| 2008/0092181 A1* | 4/2008 | Britt | 725/87 |

OTHER PUBLICATIONS

Eric Hsiao, Audible alarms for TV parental control and vchip feedback, IP.com No. IPCOM000159135D, Oct. 9, 2007.

* cited by examiner

*Primary Examiner*—John Miller
*Assistant Examiner*—John Schnurr
(74) *Attorney, Agent, or Firm*—Shimokaji & Associates, P.C.

(57) ABSTRACT

A method and system for using tagging in programming such as television programming, movie DVDs and streaming video, and establishing personalized tag alerts for objectionable programming. The invention includes the user inputting a desired class of objectionable programming, and then the user inputting a desired action for that class of objectionable programming. Content codes are mapped to the user inputs. The invention reads the tags of the programming, and then the required user action is performed based on the user inputs for that tag, which may entail skipping a scene, playing a scene, outputting alerts, or altering a scene. The user may also pre-review tagging on the frames and scenes and adjust the warnings or other actions.

1 Claim, 2 Drawing Sheets

USE TAGGING IN TELEVISION PROGRAMS FOR SCENE FILTERING AND ALERTS

BACKGROUND OF THE INVENTION

The invention relates generally to program filtering and, more particularly, to a method and apparatus of filtering programming such as television programming that is objectionable to the user.

In some prior art designs of filtering objectionable television programming, offensive language is detected, the audio is muted, and the closed captioned broadcast signal is modified. The process may consist of monitoring the closed captioned signal. Each captioned word is checked against a dictionary of offensive words stored. If an offensive word is detected, the audio is muted for the sentence, and the offensive word is removed from the closed captioned signal. A suitable word is substituted for the profanity, when appropriate, and the replacement sentence is displayed on the screen in text form.

As can be seen, there is a need for a method and apparatus of using tagging in television programs for scene filtering and alerts.

SUMMARY OF THE INVENTION

A method for using pre-existing tagging in programming that may include television programming, and establishing personalized tag alerts for said programming, comprising: accepting a plurality of first user inputs for selecting classes of objectionable content, wherein said selected classes of objectionable content may include objectionable images, objectionable suggestive solicitation, objectionable violence, objectionable adult content, and objectionable language; accepting a second user input for determining a desired action for each of said first user inputs, wherein said desired action includes at least one of: outputting a notice of an upcoming said tagged scene, playing a tagged scene, skipping said tagged scene, outputting a written alert prior to said tagged scene, displaying a warning icon for said tagged scene prior to said tagged scene, and altering content of said tagged scene, wherein a tagged scene may comprise a single frame; storing a mapping of said first user input to said second user input; calculating a valid forewarn range time based on data that my include the data transmission speed of the devices used and the time length of said tagged frames and said tagged scenes; prompting said user to choose a time interval based on said calculated forewarn range time; accepting a third user input for determining a desired time interval for outputting a notice of an upcoming said tagged scene prior to the playing of said tagged scene; reading said pre-existing tagging in said programming, wherein said reading is frame-by-frame or scene-by-scene; matching said pre-existing tags with one of said first user inputs; outputting a pre-review display to the user, wherein said user may review said pre-existing tagging for said tagged scenes, and wherein said user may review and change all said previously stored first, second and third user inputs; performing said desired action with regard to said programming matched with said second user input, mapped in said database to said first user input, and matched to said pre-existing tag, wherein outputting a notice of an upcoming said tagged scene outputs a notice to the user at said time interval prior to said tagged scene set by said third user input; wherein playing said tagged scene plays said tagged scene without changing said tagged scene, wherein skipping said tagged scene skips said tagged scene, wherein outputting a written alert outputs a written alert on said programming before said tagged scene, wherein displaying a warning icon for said tagged scene outputs visual icons mapped to said tagged scenes of said programming, wherein said visual icons may include an icon displaying a martini glass mapped to content class adult content, male and female icons mapped to content class objectionable sexual content, and a frowning face icon mapped to undesired language, and wherein altering content of said tagged scene includes blurring the audio of said tagged scene, blurring the video of said tagged scene, and replacing undesired words with desired words in said tagged scene; and wherein said tag alerts and said user inputs may be implemented through a device separate from a television set including a remote controlled device, or with embedded software within a cable or satellite television hosting environment.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
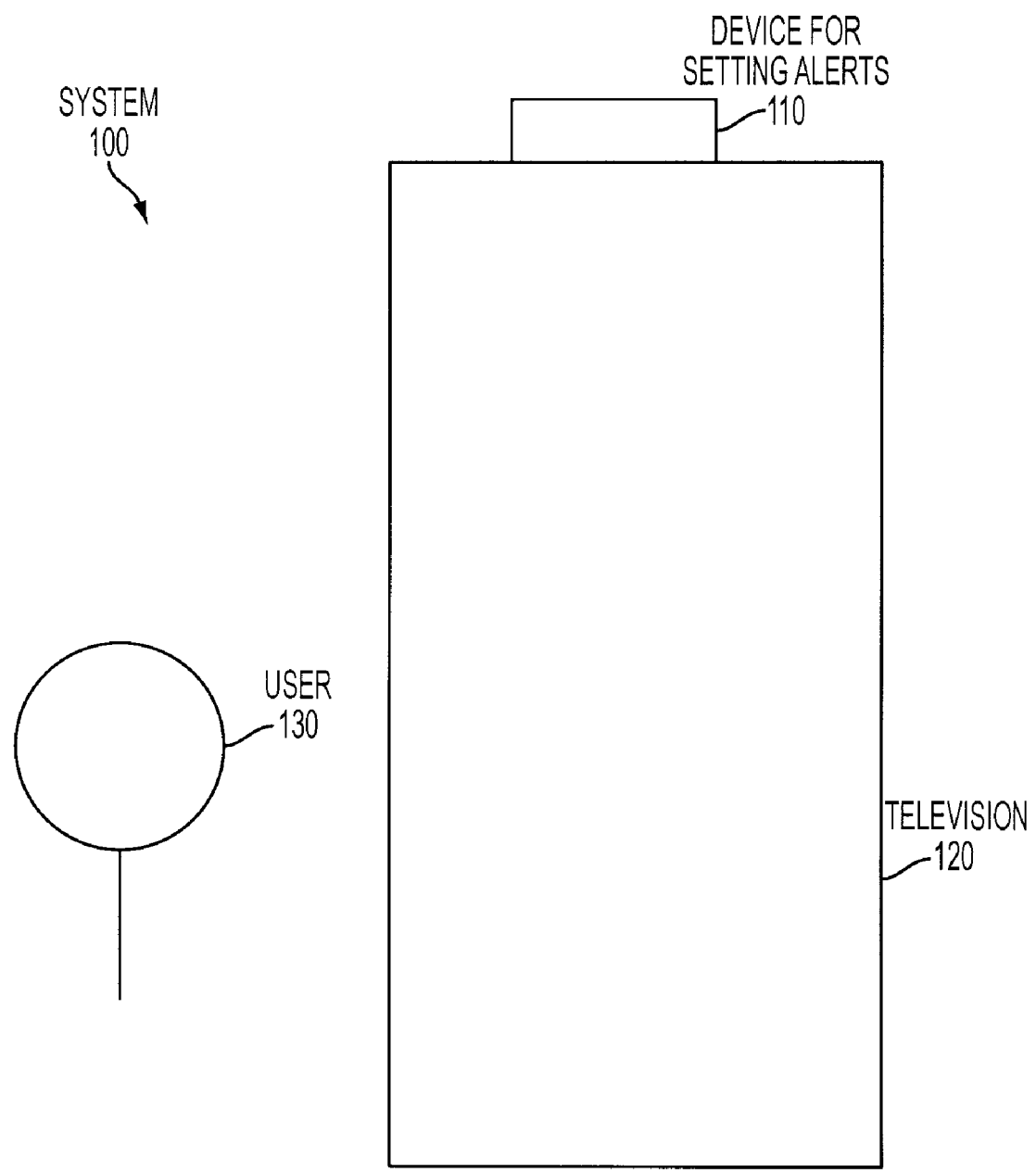
FIG. 1 is an illustration of the invention implemented as a device external to the television.

Referring to FIG. 1, a system 100 of using tagging of programs, that may include television programs, to provide personalized alerts is depicted according to one exemplary embodiment of the present invention. A device 110 for accepting user input or implementing the tag alerts may be a device separate from a television set 120, such as a stand-alone box with enabling software, or a remote controlled device, or the device 110 may be embedded software within a cable or satellite input signal hosting environment.

Unlike the prior art, the present invention uses tags in programming for implementing personalized alerts. As described in this invention, a tag can be a relevant keyword or term associated with or assigned with or assigned to a piece of information. Examples of information are pictures, a geographic map, a blog entry, or a video clip. An example of tagging is closed captioning in television programming. Tags can describe the item and enable keyword-based classification and search of information. In this invention the television programming can be tagged during production of the television programming.

Figure 2:
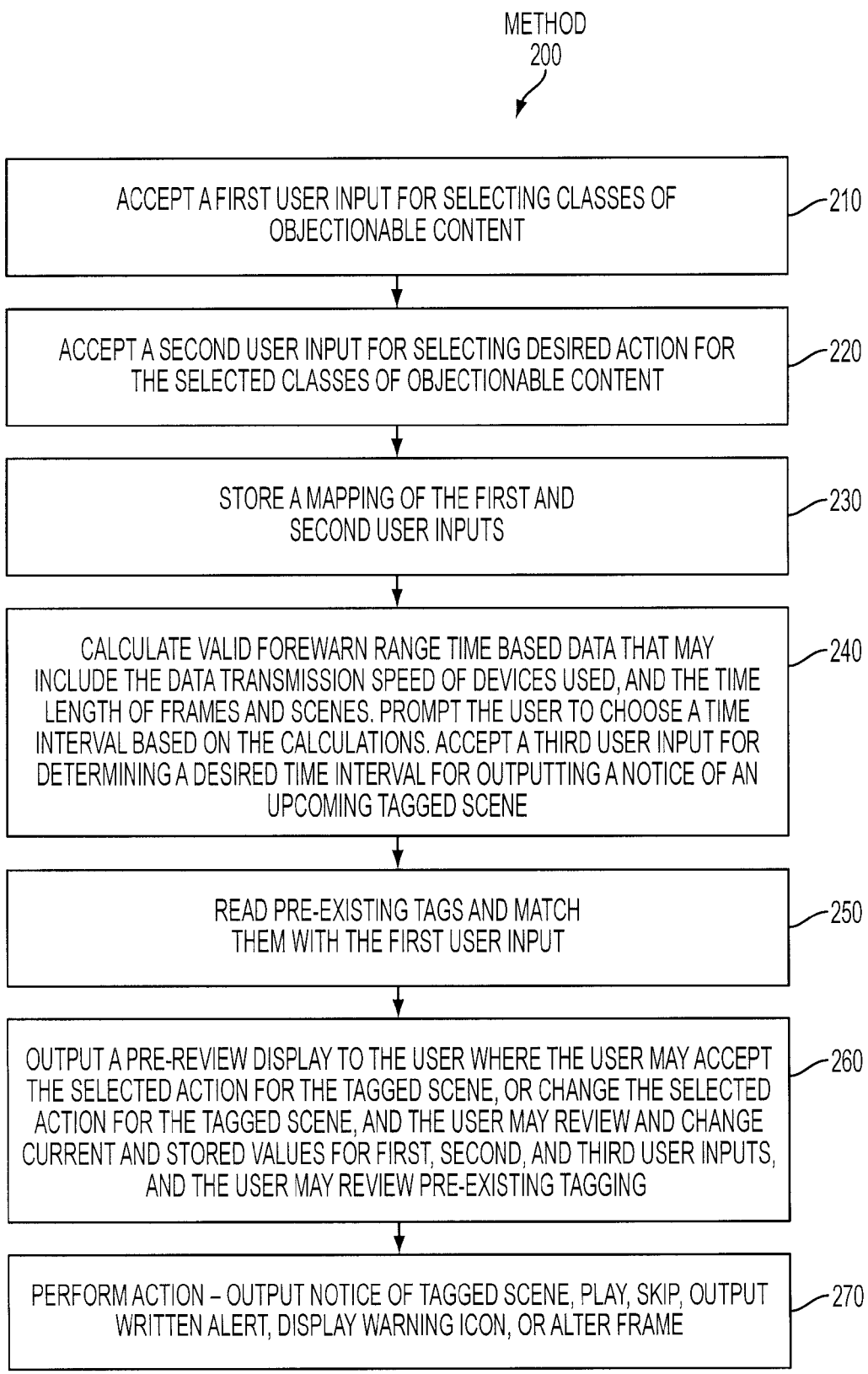
FIG. 2 is a flow chart representing a series of steps involved in a method for implementing the invention.

In operation, referring to FIG. 2, a method 200 according to an exemplary embodiment of the present invention may include a step 210 of the user 130 inputting a selected class of objectionable television programming. As an example, the class may comprise objectionable images, objectionable suggestive solicitation, objectionable violence, objectionable adult content, or objectionable language.

The method 200 may further include a step 220 of the user 130 inputting a second user input, a desired action for a specified class of objectionable programming. The selections for the desired action may include outputting a notice of an upcoming tagged scene or frame, playing a tagged scene or frame, skipping a tagged scene or frame, outputting a written alert prior to said tagged scene or frame, displaying a warning icon for a tagged scene or frame prior to said tagged scene or frame, or altering the content of a tagged scene or frame.

A step 230 can provide for storing a mapping of the first and second user inputs, such as in the device 110.

The method 200 may include a step 240 of calculating a valid forewarn range time based on data that may include the data transmission speed of the device used and the time length of said tagged frames and said tagged scenes, prompting the user to choose a time interval based on said calculated forewarn range time, and the user 130 inputting a third user input for determining a desired time interval for outputting a notice of an upcoming tagged scene, prior to the playing of said tagged scene.

A step 250 may then include reading pre-existing tags in the television programming and matching the pre-existing tags to the first user input, such as by the device 110. Such reading may be done by reading the closed captioning on a television program. The reading may be done scene-by-scene or frame-by-frame. If the tag indicates profanity, the tag can be matched to the first user input stored in the device 110.

The method 200 may include a step 260 for outputting a pre-review display to the user, such as on said television 120. The step 260 may further give the user 130 the option of reviewing and changing stored values for the first, second, and third user inputs 210, 220, 230. The step 260 can also give the user 130 the option of reviewing tagging on the programming.

The method 200 may include a step 270 wherein the invention may output a notice of an upcoming tagged scene such that the notice may appear at the time interval before the tagged scene as the user 130 input in the step 240. The step 270 may also include playing the programming with objectionable material played, warned, or altered as specified according to the user inputs, such as in steps 210, 220. After the tag has been matched to a first user input stored in the device 110, as in step 250, the action mapped to that first user input may then be performed as in step 270. If the user 130 by inputting user input as in steps 210, 220, selects that a particular class of objectionable material is to be played without changes, the method 200 may perform the step 270 of playing the programming without changes. If the user 130 by inputting user inputs as in steps 210, 220, selects that the class objectionable violence is to be skipped, the method 200 may perform the step 270 of playing the programming with the scenes or frames of objectionable violence skipped.

For example, if the user 130 by inputting user inputs as in steps 210, 220 selects that the class of objectionable violence is to play with a written alert output to the user, the method 200 may perform the step 270 of playing the programming with a written alert outputted on the television screen prior to the objectionable violence being played. If the user 130 by inputting user inputs as in steps 210, 220 selects that a warning icon was to be displayed prior to programming of content class "objectionable violence" being displayed 250, the method 200 may perform the step 270 of playing the programming and outputting the warning icon prior to such "objectionable violence" being displayed. An icon displaying a frowning face can be mapped to content class "objectionable language", an icon displaying a martini glass can be mapped to content class "adult content", and male and female icons can be mapped to content class "objectionable sexual content".

If the user by inputting user inputs as in steps 210, 220, selects that the content of the selected objectionable class is to be altered, the method 200 may perform the step 270 of playing the programming and altering or blurring, for example, the audio or video of the scene or frame, or alter the words actually sounded in the programming. The user 130 may by inputting user inputs as in steps 210, 220 select that an objectionable language type sounded in the programming is to be replaced with a mild word indicating displeasure. The method 200 may then perform the step 270 of playing the program, and replace the profanity with a mild wording indicating displeasure. For example, the mild word replacing the profanity may be a user input as in step 220.

It should be understood, of course, that the foregoing relates to exemplary embodiments of the invention and that modifications may be made without departing from the spirit and scope of the invention as set forth in the following claims.

We claim:

1. A method for using pre-existing tagging in programming, that may include television programming, and establishing personalized tag alerts for said programming, comprising:

accepting a plurality of first user inputs for selecting classes of objectionable content, wherein said selected classes of objectionable content may include objectionable images, objectionable suggestive solicitation, objectionable violence, objectionable adult content, and objectionable language;

accepting a second user input for determining a desired action for each of said first user inputs, wherein said desired action includes at least one of: outputting a notice of an upcoming said tagged scene, playing a tagged scene, skipping said tagged scene, outputting a written alert prior to said tagged scene, displaying a warning icon for said tagged scene prior to said tagged scene, and altering content of said tagged scene, wherein a tagged scene may comprise a single frame;

storing a mapping of said first user input to said second user input;

calculating a valid forewarn range time based on data that may include the data transmission speed of the devices used and the time length of said tagged frames and said tagged scenes;

prompting said user to choose a time interval based on said calculated forewarn range time;

accepting a third user input for determining a desired time interval for outputting a notice of an upcoming said tagged scene prior to the playing of said tagged scene;

reading said pre-existing tagging in said programming, wherein said reading is frame-by-frame or scene-by-scene;

matching said pre-existing tags with one of said first user inputs;

outputting a pre-review display to the user,
   wherein said user may review said pre-existing tagging for said tagged scenes, and
   wherein said user may review and change all said previously stored first, second and third user inputs;

performing said desired action with regard to said programming matched with said second user input, mapped in said database to said first user input, and matched to said pre-existing tag,
   wherein outputting a notice of an upcoming said tagged scene outputs a notice to the user at said time interval prior to said tagged scene set by said third user input;
   wherein playing said tagged scene plays said tagged scene without changing said tagged scene,
   wherein skipping said tagged scene skips said tagged scene,
   wherein outputting a written alert outputs a written alert on said programming before said tagged scene,
   wherein displaying a warning icon for said tagged scene outputs visual icons mapped to said tagged scenes of said programming, wherein said visual icons may include an icon displaying a martini glass mapped to content class adult content, male and female icons mapped to content class objectionable sexual content, and a frowning face icon mapped to undesired language, and wherein altering content of said tagged scene includes blurring the audio of said tagged scene, blurring the video of said tagged scene, and replacing undesired words with desired words in said tagged scene; and wherein said tag alerts and said user inputs may be implemented through a device separate from a television set, including a remote controlled device, or with embedded software within a cable or satellite television hosting environment.

* * * * *